July 11, 1950  W. H. HAUPT  2,515,004
ELECTRICAL TESTING DEVICE
Filed Dec. 12, 1947

INVENTOR.
WALTER H. HAUPT.
BY
Allen & Allen
ATTORNEYS.

Patented July 11, 1950

2,515,004

UNITED STATES PATENT OFFICE 2,515,004

ELECTRICAL TESTING DEVICE

Walter H. Haupt, Ludlow, Ky., assignor to The Kelley-Koett Manufacturing Co., Covington, Ky., a corporation of Ohio Application December 12, 1947, Serial No. 791,417

2 Claims. (Cl. 200—51)

My invention pertains to electrical apparatus, and in particular to a device for testing various conditions of electrical conductors, such as the conditions of continuity, resistance, insulation value and the like.

In such testing, heretofore, it has been common practice to set up a test circuit containing a source of selected voltage, and such indicating or measuring means as may be desired, and to apply the selected voltage from this circuit to the test object by means of manually held probes. These probes comprise an insulating handle to which a pointed metallic rod is attached, a supply wire entering the handle and being electrically connected to the rod. The rod is of course exposed, and is at test voltage potential when the test circuit is energized.

In testing electrical apparatus such as domestic or household appliances, the voltage employed may be as great as 250 volts; but in the case of large electrical equipment the voltage employed may be many times this value. Hence the exposed rods on the probes constitute a distinct hazard. If parts of the workers' bodies come into contact with the probe rods painful or dangerous shocks may be experienced. If the probes are accidentally brought into contact with metallic objects, valuable equipment may be destroyed, or destructive arcing may occur. If the probe rods are accidentally brought together arcing may likewise occur, and possible damage to valuable test equipment. It is a general rule that the probes should be de-energized after each use; but the inconvenience of switching the test circuit on or off for each use, and usually at some remote point, results in a tendency for the operator to leave the probes in exposed, energized condition when they are not actually being employed for testing. Sparking and arcing are likely to occur even in the correct use of the probes; and this may be dangerous in conditions where the surrounding atmosphere contains explosive materials.

Thus the use of the conventional testing arrangements is not free from safety hazards, and the test operator, being required to exercise extraordinary care, is subjected to a considerable degree of nervous tension. The consequences of carelessness in testing, and of the use of test equipment by casual or inexperienced personnel, may be extremely serious. Caution and unrelaxed attention by a skilled operator have been required, and the testing operation is, accordingly more fatiguing and more expensive than is desirable.

It is an object of my invention to provide testing means which eliminate the safety hazards discussed above and which make it possible for the testing operation to be carried on safely by persons of less skill.

Another object of my invention is the provision of a test probe which may be kept conveniently at hand and in continuous connection with an energized electrical testing circuit, and which yet will be free from the hazard of electric shock, accidental short circuit, and the like.

A further object of the invention is the provision of a test probe which may be safely used under conditions of suspected or actual explosive atmosphere.

These and other objects of the invention which will be set forth hereinafter or will be apparent to one skilled in the art upon reading these specifications, I accomplish by that construction and arrangements of parts of which I shall now describe certain exemplary embodiments. Reference is made to the accompanying drawings in which.

Figure 1:
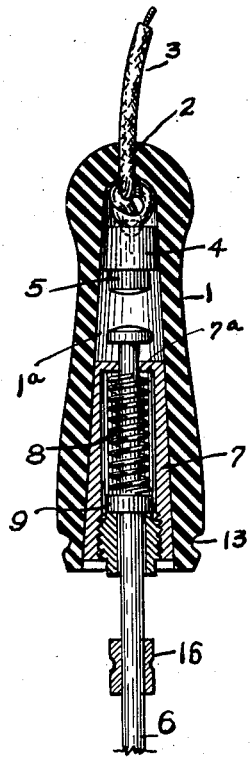
Figure 1 is a longitudinal sectional view of one embodiment of my improved probe.

As shown in the drawing, I provide a handle or grip member 1 which is of hollow construction, and formed of any suitable insulating material such, for example, as Bakelite or other synthetic resin, hard rubber, or the like. At its upper end the handle is provided with a perforation 2 to receive a conductor wire or cable 3. The main bore of the handle is shaped to receive a metal plug 4 having a contact portion 5. The supply wire 3 is soldered or otherwise attached to the metal plug 4, and it may be provided with a knot as shown to provide strain relief for the soldered connection. In my drawings I have shown the main bore 1a of the handle grip element of tapered formation, and the plug 4 having a press fit therein. A press or wedge fit for the plug 4 and for the rod holder and control means hereinafter described is a satisfactory and inexpensive construction in my device, and is fully operative because stresses imposed on either of these elements during use will be in the direction of tighter engagement. However other constructions are possible, and by way of example I may provide a threaded bore, and thread the last mentioned elements for engagement therein.

Figure 2:
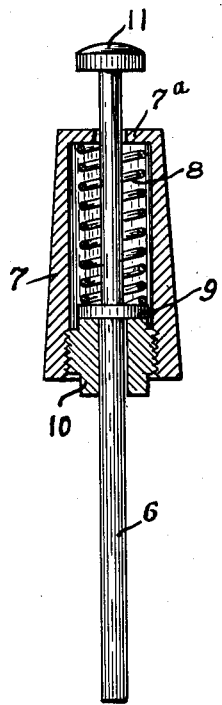
Figure 2 is an enlarged sectional view of the probe rod and associated parts.

Referring to Figure 2 I provide a rod element 6 which is the probe proper as distinguished from the handle. This rod element passes through a sleeve member 7 shaped for engagement in the bore 1a of the handle. If this is a tapered bore, the outside surface of the sleeve member 7 will be similarly tapered.

The upper end of the sleeve member is provided with a perforated shoulder 7a, and a coiled spring 8 engages between this shoulder and a spring retaining collar 9 which is fast on the rod 6. The lower end of the sleeve 7 is threaded as shown, and an externally threaded nut 10, perforated to receive the rod 6 is engaged therein.

The action of the compression spring 8 is to move the rod 6 downwardly until the retaining collar 9 engages the nut 10 as shown in Figure 2. The rod 6 may however be moved in the opposite direction against the tension of the spring 8. The rod bears on its upper end a contact member indicated at 11.

It will be evident from the assembled view, Figure 1, that the action of the spring is to keep the rod 6 in a position of furthest possible extension from the handle 1, the contact members 5 and 11 being separated and out of contact in this position. As a result, even though the supply wire 3 is live, the probe rod 6 will not be in electrical connection with it unless or until the rod 6 is driven upwardly within the handle 1 by a positive thrust.

As a consequence the probe may be laid down on any convenient support near the locality of its use, without danger of shock or electrical short circuit. When it is desired to use the probe, it is grasped by the handle 1, the end of rod 6, which may be pointed or otherwise shaped as desired is brought against the member to which the test circuit is to be connected. The rod 6 is not, however, energized by the test circuit until sufficient force has been applied to the handle 1 to overcome the resistance of the spring 8 and force the rod 6 into the interior of the handle 1 far enough to bring the contact members 5 and 11 together. By controlling the strength of the spring 8, the force required to effect energization of the probe rod 6 may be varied as desired. In ordinary testing operations it is advantageous so to construct my probes that a positive pressure of several pounds is required to bring the contacts 5 and 11 together. It will be clear, moreover, that as soon as this pressure is released, the spring 8 drives the probe rod 6 downwardly or forwardly, de-energizing it. Thus the operator is certain that his probes are de-energized except when in actual use.

Yet again it will be seen that when the probe rod 6 is brought into contact with an electrical member to be tested, it is de-energized and does not become energized until the contact members 5 and 11 are brought together. This occurs in the interior of the handle 1, so that any arcing or sparking resulting from the opening or closing of these contacts occurs in the hollow interior of the handle 1, and the operator is protected from the effects thereof.

Figure 3:
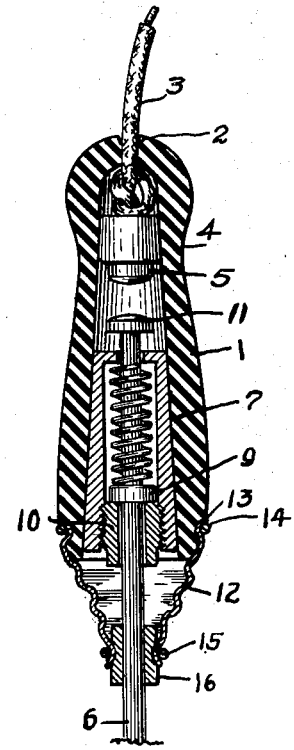
Figure 3 is a longitudinal section of a modified structure adapted for use in explosive atmospheres.

This factor makes it possible for me to provide a probe which is safe for use in explosive atmospheres. In Figure 3 like parts have been indicated by like index numerals. I have indicated at 12 a skirt or bellows which may be formed from any suitable impervious flexible material such as rubber, rubberized fabric, any of the commercially available plastic compositions, or other flexible substance. This bellows or skirt may be held at its upper end in a groove 13 in the end of the handle member 1 by means of a clamping ring or wire 14. The lower end of the skirt is similarly fastened by a ring or wire 15 to a groove in a collar member 16 on the probe rod 6. The skirt permits the operation of the rod as hereinafter described, while positively closing the interior of the handle or grip member 1 to the external atmosphere. It will be understood that this interior is sealed off at the top by the plug member 4. Since it is impossible to bring the probe rod 6 into contact with an external element while the rod 6 is in electrically live condition, and since any arcing or sparking incident to the energization or de-energization of the rod 6 occurs in the interior of the handle 1, it will be seen that the construction in Figure 3 avoids the danger of ignition of explosive materials in the surrounding atmosphere.

Modifications may be made in my invention without departing from the spirit of it. Having thus described my invention in certain exemplary embodiments, what I claim as new and desire to secure by Letters Patent is:

1. In a safety probe device an insulating handle having a tapered bore; a stationary plug having a press fit in one end of said bore; an insulated supply wire extending through said handle and electrically connected to said plug; a sleeve in the opposite end of said bore and having a press fit therein; a perforated shoulder on one end of said sleeve; said sleeve and shoulder, a portion of said bore and said plug forming a chamber within said handle; a contact element on said plug extending into said chamber; a probe rod slidably mounted in said sleeve and perforated shoulder; a second contact element upon said probe and extending into said chamber; said second contact element being adapted to be brought, by sliding movement of said rod, into contact with said first-mentioned contact element within said chamber; said rod bearing an abutment within said sleeve; and a coiled spring engaged between said shoulder and said abutment to normally maintain said second contact element out of contact with said first-mentioned contact element whereby positive pressure on said rod is required to bring said rod into electrical connection with said supply wire.

2. The structure claimed in claim 1 wherein the end of said handle from which said rod projects is connected with said rod by a gas-tight flexible member and wherein said stationary plug has a gas-tight fit in said bore.

WALTER H. HAUPT.

REFERENCES CITED

The following references are of record in the file of this patent:

UNITED STATES PATENTS

| Number | Name | Date |
|---|---|---|
| 1,043,759 | Fisher | Nov. 5, 1912 |
| 1,903,135 | Rees | Mar. 28, 1933 |
| 2,020,402 | Edwards et al. | Nov. 12, 1935 |
| 2,404,682 | Baker | July 23, 1946 |

FOREIGN PATENTS

| Number | Country | Date |
|---|---|---|
| 489,378 | Germany | Jan. 17, 1930 |
| 553,665 | Great Britain | May 31, 1943 |